(12) United States Patent
Achenbach et al.

(10) Patent No.: US 6,294,635 B1
(45) Date of Patent: Sep. 25, 2001

(54) ADDITION-CROSSLINKING COMPOSITIONS WHICH GIVE HEAT-STABLE SILICONE RUBBER

(75) Inventors: Frank Achenbach, Simbach a. Inn; Herbert Barthel, Emmerting, both of (DE)

(73) Assignee: Wacker-Chemie GmbH, München (DE)

( * ) Notice: Subject to any disclaimer, the term of this patent is extended or adjusted under 35 U.S.C. 154(b) by 0 days.

(21) Appl. No.: 08/381,809

(22) Filed: Feb. 1, 1995

(30) Foreign Application Priority Data

Feb. 18, 1994 (DE) ................................................ 44 05 245

(51) Int. Cl.⁷ .................................................... C08G 77/06
(52) U.S. Cl. ............................ 528/15; 524/403; 525/474; 525/475
(58) Field of Search ............................... 524/403; 528/15; 525/474, 475

(56) References Cited

U.S. PATENT DOCUMENTS

| 4,273,902 | * | 6/1981 | Tomioka et al. | 528/31 |
|---|---|---|---|---|
| 4,293,477 | * | 10/1981 | Theodore | 524/403 |
| 4,359,565 | * | 11/1982 | Puppe et al. | 528/15 |
| 4,394,294 | * | 7/1983 | Gryaznov et al. | 252/430 |
| 4,417,068 | * | 11/1983 | Kollmeier et al. | 556/479 |
| 4,529,752 | * | 7/1985 | Bluestein | 523/212 |
| 4,647,699 | * | 3/1987 | Panster et al. | 556/9 |
| 4,677,095 | * | 6/1987 | Wan et al. | 502/262 |
| 4,680,365 | * | 7/1987 | Muller et al. | 528/31 |
| 4,701,488 | * | 10/1987 | Williams | 524/403 |
| 4,783,552 | * | 11/1988 | Lo et al. | 528/31 |
| 4,970,245 | * | 11/1990 | Futami et al. | 525/100 |
| 5,106,933 | * | 4/1992 | Kobayashi et al. | 528/15 |
| 5,142,035 | * | 8/1992 | Lewis | 523/201 |
| 5,185,458 | * | 2/1993 | Huggins | 556/9 |
| 5,237,019 | * | 8/1993 | Wieland et al. | 525/475 |
| 5,250,487 | * | 10/1993 | Wirtz et al. | 502/243 |
| 5,264,514 | * | 11/1993 | Panster et al. | 528/9 |

FOREIGN PATENT DOCUMENTS

| 0091737 | 10/1983 | (EP) . |
|---|---|---|
| 0231519 | 8/1987 | (EP) . |
| 02-18453 | * 1/1990 | (JP) . |

OTHER PUBLICATIONS

CA 117:214261.
Izv. Vyssh. Uchebn. Zaved., Khim, Khim, Tekhnol., 1992, 35(6), 66–71.

* cited by examiner

*Primary Examiner*—Robert Dawson
(74) *Attorney, Agent, or Firm*—Brooks & Kushman P.C.

(57) ABSTRACT

The addition-crosslinking silicone rubber compositions which crosslink to give a silicone rubber of increased heat resistance comprising a palladium-containing heat stabilizer.

17 Claims, No Drawings

ADDITION-CROSSLINKING COMPOSITIONS WHICH GIVE HEAT-STABLE SILICONE RUBBER

FIELD OF INVENTION

The present invention relates to addition-crosslinking silicone rubber compositions which crosslink to give a silicone rubber of increased heat resistance because they comprise a palladium-containing heat stabilizer, and to the use of palladium and compounds thereof as a heat stabilizer in addition-crosslinking silicone rubber compositions.

BACKGROUND OF INVENTION

Silicone rubbers have a higher heat stability than organic elastomers. Nevertheless, relatively long open storage at temperatures above 200° C. leads to an increasing loss in mechanical strength and elasticity, which is called embrittlement. Furthermore, a rapid weight loss is recorded at temperatures above 300° C., this being accompanied by a silicification of the silicone rubber. For these reasons, silicone rubbers which have not been heat-stabilized are of only limited suitability for applications which include exposure to temperatures above 220° C. over a relatively long period of time. Possible causes of the loss in elastomeric properties of the silicone rubber at higher temperatures are, thermal and thermooxidative changes in the organic side groups of the polymer chains, crosslinking sites being re-formed and depolymerization processes, such as cleavage of SiOSi bonds and formation of rings.

However, the heat stability of silicones can be improved considerably by addition of so-called heat stabilizers, such as the elements and compounds of the transition metals and lanthanides. For example, EP-A-231 519 describes the use of acetylacetonates, as heat stabilizers for addition-crosslinking 2-component silicone rubber compositions, of copper, zinc, aluminum, iron, cerium, zirconium and titanium.

There are considerable differences in the activity of the metal-containing heat stabilizers used. These differences in the activity of the metals are, also the consequence of the various forms of application, such as metal dust, dispersion of insoluble metal compounds or silicone-soluble metal compounds, and are founded in the different composition of the silicone materials to be stabilized, such as silicone oils or peroxide-, condensation-, addition- or radiation-crosslinking silicone elastomers. Nevertheless, it can be said that above all the 3d transition metals, in particular Ti, Mn, Fe, Co, Ni and Cu, the sub-group elements of the 4th period, that is to say Ti, Zr and Hf, and the lanthanides, above all Ce, have proved to be metals having a heat-stabilizing action.

The publication "Izv. Vyssh. Uchebn. Zaved., Khim, Khim, Tekhnol., 1992, 35 (6), 66–71" describes metal complexes of a macrocyclic triisoindole-benzene compound, which are comparable structurally to phthalocyanine complexes and contain either Zr, Y, Pd or Al as metals, as stabilizers for increasing the heat stability and flame resistance of condensation-crosslinking silicone rubbers. The heat-stabilizing action of these complex compounds is evaluated only by the loss in weight during storage in the open at 450° C., the heat-stabilizing efficiency increasing in the sequence of metals Al<Pd<Y<Zr. However, the loss in weight of the silicone rubber which occurs during storage at 450° C. is not conclusive for the retention of the elastomer properties of stabilized silicone rubbers at typical upper use temperatures, which are between 200° C. and 300° C. The lower heat-stabilizing action of $Ni_3O_4$ and $Co_2O_3$ used for comparison and the virtually comparable action of the metal-free triisoindole-benzene compounds suggest that it is above all a stabilizing effect of the triisoindole-benzene component in the metal complexes.

The object was to provide particularly heat-stable addition-crosslinking silicone rubber compositions.

SUMMARY OF INVENTION

The present invention relates to addition-crosslinking silicone rubber compositions which crosslink to give a silicone rubber having an increased heat resistance, wherein the silicone rubber compositions comprise a palladium-containing heat stabilizer.

Palladium-containing addition-crosslinked silicone rubbers have a significantly higher heat stability than silicone rubbers which comprise other metals as the heat-stabilizing additive. It is thus possible for the use properties of silicone rubbers to be maintained for a longer time at higher temperatures than previously. In particular, the mechanical elastomer properties, such as Shore A hardness, tensile strength, complex dynamic modulus under compressive deformation, elongation at break and tear strength, are retained to a particularly high degree after exposure to heat.

Addition-crosslinked silicone rubbers which comprise palladium for the purpose of heat stabilization are pale yellowish, yellowish-pale brown to dark brown in color, depending on the palladium content. If the palladium-containing heat stabilizer is sufficiently finely distributed, the transparency of the silicone rubber is not adversely affected. In contrast to other heat stabilizers, such as carbon black, even very small amounts of palladium have proved to be sufficient to achieve the desired heat-stabilizing effect.

In view of the numerous metals and metal compounds of which a heat-stabilizing activity is known, it is astonishing that the exceptionally high heat-stabilizing activity of palladium and compounds thereof has so far remained ignored. The exceptional heat stability of palladium-containing addition-crosslinked silicone rubbers during storage in the open with access of fresh air is astonishing and unexpected, however, in as much as palladium is known as a catalyst for total oxidation of organic compounds.

The palladium-containing heat stabilizer is called constituent (I) below. The palladium in itself can be introduced into the silicone rubber composition in any desired form and in any desired manner. However, the activity as a heat stabilizer is better at a fine distribution.

Elemental palladium, such as palladium powder, colloidal palladium and palladium black, if appropriate fixed on finely divided support materials, such as active charcoal, carbon black, aluminum oxide, barium sulfate or carbonate, calcium sulfate or carbonate, quartz flour or pyrogenic or precipitated silica, can be used as constituent (I). The particle size of the palladium particles and of the carrier materials is preferably below 100 $\mu$m, in order to ensure fine distribution of the palladium in the silicone rubber composition.

Constituent (I) can also be palladium in the form of its compounds. In this case, the palladium compound, or a mixture of various palladium compounds, is dissolved, partly dissolved or dispersed in a constituent or a mixture of several constituents of the silicone rubber composition according to the invention, with the aid of a solvent or a solvent mixture and/or at elevated temperature. Any desired palladium compounds can be employed. The palladium compounds employed are preferably anhydrous or water-containing compounds of the general formulae $PdX_2$, $L_2PdX_2$, $L_2Pd_2X_2$, $L_4PdX_2$, $L_2PdX_4$, $PdL_4$, $M_2PdX_4$ or $M_2PdX_6$, in which X is a halide, such as Cl, Br and I, a complex inorganic acid radical, such as $NO_2$, $NO_3$, $0.5\ SO_4$ and CN, a carboxylic acid radical of the general formula OCOR', in which R' is an unsubstituted or substituted alkyl, cycloalkyl or aryl radical having 1–20 C atoms, in particular acetate and trifluoroacetate, or a complexing unsubstituted or substituted organic anion, such as acetylacetonate, hexafluoroacetylacetonate and 0.5 phthalocyaninato, or OH, L is a donor which is chosen from the group consisting of nitrogen-containing ligands, such as $NH_3$, primary, secondary and tertiary amines of the formula $NR''_3$, in which R'' can be a hydrogen atom or an alkyl, cycloalkyl or aryl radical, diamines, and bipyridyl, from the group consisting of phosphorus-containing ligands, such as $PR''_3$ and $Ph_2P-(CH_2)n-PPh_2$, in which n has the values 1 or 2, CO, $H_2O$, dimethylformamide, dimethylsulfoxide, nitriles, in particular dibenzonitrile and acetonitrile, and the dienes, such as 0.5 cyclooctadiene and 0.5 norbornadiene, and M is a hydrogen atom, $NH_4$ or an alkali metal or alkaline earth metal, such as Li, Na, K, Cs or 0.5 Ba.

The palladium compounds employed as the heat stabilizer do not necessarily have to be mixed directly into constituents of the silicone rubber composition according to the invention, but may be dissolved or dispersed in a suitable carrier medium beforehand. Materials which are miscible with the silicone rubber composition according to the invention or are soluble in this or can be finely distributed in it are suitable as the carrier medium. These include, for example, solvents, solvent mixtures, organosilicon compounds, such as oligo- and polyorganosiloxanes, and finely divided fillers, as well as mixtures thereof.

The majority of the above mentioned palladium compounds are insoluble or soluble to only a small degree in apolar media, also in the non-crosslinked silicone rubber compositions. Although homogeneous mixtures in general can be prepared with the aid of suitable solvents, the palladium compound often precipitates again when the solvent is removed, which prevents uniformly fine distribution of the palladium. Numerous methods to achieve a homogeneous distribution of the palladium in apolar media have been described in the literature. A preferred possibility comprises addition of a suitable reducing agent to the homogeneous mixture comprising the palladium compound, so that elemental palladium is formed in colloidal form and is also present in this form in the carrier material after removal of the solvent. Examples of reducing agents which can be used are hydrogen, carbon monoxide, formaldehyde, hydrazine and hydrazine derivatives, linear or branched alcohols having 1 to 5 C atoms, alkali metal or alkaline earth metal formates, borohydrides, hydrides and alanates, and in particular SiH-containing organosilicon compounds, such as silanes and SiH-containing siloxanes.

Another preferred possibility for preparing homogeneous palladium-containing mixtures comprises reacting suitably functionalized siloxanes, which are readily soluble in non-crosslinked silicone rubber compositions, with palladium compounds to give palladium-containing siloxanes. For this, the siloxane must have at least one group which is capable of forming a sufficiently firm bond with the palladium. Examples of suitable reactive groups are alkenyl groups having 1 to 6 C atoms, such as vinyl, allyl and 5-hexenyl, and primary, secondary or tertiary amino groups, such as 3-aminopropyl, 4-aminobutyl, N-(2-aminoethyl)-3-aminopropyl, 3-(cyclohexylamino)propyl or pyridyl groups.

Insoluble palladium compounds, such as palladium(II) phthalocyanine, can also be dispersed directly in finely divided form in the non-crosslinked silicone rubber composition.

The use of palladium-containing silica, which at the same time are effective as actively reinforcing fillers in the silicone rubber, is particularly preferred. Finely divided silicon dioxide having an average primary particle diameter of less than 1 $\mu$m is employed as such a filler, and actively reinforcing, very finely divided silica having a specific surface area of 25 to 400 $m^2/g$ (determination by the BET method in accordance with DIN 66131 and 66132), in particular precipitated or fumed silica, are preferred.

The palladium-containing silica can be prepared by adding to the silica the palladium compound dissolved in a suitable solvent or solvent mixture, or colloidal palladium in a suitable solvent or solvent mixture, or by adding the palladium compound dissolved in a suitable solvent or solvent mixture to the silica and then reducing it to palladium black on the silica with a reducing agent. All the above mentioned palladium compounds are suitable in principle for this purpose, as long as they have an adequate solubility in the solvent or solvent mixture used. Solvents which can be employed are the above mentioned solvents. The preparation of colloidal palladium in a solvent or of palladium black on silicic acid can be carried out as described above.

Hydrophilic silica or silica which have been surface-treated and hydrophobized with an agent which renders them hydrophobic, for example, a silylating agent, can be employed for this purpose. Silylating agents which can be employed are organo-silicon compounds, as mentioned below. If hydrophobic silica is employed, the use of palladium compounds dissolved in organic solvents is preferred. If hydrophilic silica is employed, palladium compounds dissolved in organic solvents or in aqueous solvents can be employed.

Organic solvents or solvent mixtures having a boiling point or boiling range of up to 120° C. under 0.1 hPa are preferably employed. Examples of such solvents are alcohols, such as methanol, ethanol, n-propanol and iso-propanol; ethers, such as dioxane, tetrahydrofuran, diethyl ether and diethylene glycol dimethyl ether; chlorinated hydrocarbons, such as methylene chloride, chloroform, carbon tetrachloride, 1,2-dichloroethane and trichloroethylene; hydrocarbons, such as pentane, n-hexane, hexane isomer mixtures, cyclohexane, heptane, octane, wash benzine, petroleum ether, benzene, toluene and xylenes; ketones, such as acetone, methyl ethyl ketone and methyl isobutyl ketone; inert organosilicon compounds, such as siloxanes, for example hexamethyldisiloxane; carbon disulfide and nitrobenzene, or mixtures of these solvents.

If aqueous solvents are employed, it is preferable to use palladium(II) nitrate, palladium(II) sulfate, palladium(II) chloride, palladium(II) compounds of the $M_2PdCl_4$ type, in which M is one Li, Na or K, palladium(II) acetate, palladium (II) trifluoroacetate, palladium(II) acetylacetonate, palladium bis(acetonitrile) dichloride and palladium bis (benzonitrile) dichloride.

The palladium compounds can be added in amounts, based on the filler, of 1 ppm by weight to 10% by weight, preferably 10 to 5000 ppm by weight, in particular 50 to 5000 ppm by weight, calculated as the palladium content of the filler. The treatment of the surface of the filler with the palladium compound is carried out by intensive mixing of the two components. This can be effected, by introduction, for example, spraying of the very finely divided palladium-containing liquid component into the silica, which is static or fluidized by stirring or by fluidized bed techniques. It can also be effected, by suspending, stirring or dispersing the silica in a suitable inert solvent and adding the palladium-containing liquid components, for example the dissolved palladium compound or colloidal palladium, and then mixing the component intensively by stirring and/or by dispersing and shearing.

This can preferably be carried out at temperatures from −80° C. to not more than a temperature which is 10° C. lower than the boiling point of the solvent used, but not more than 350° C., in particular at 0° C. to 200° C. The coating is preferably carried out under normal pressure and within a period of time of from 5 seconds to 24 hours, in particular 1 minute to 60 minutes.

The treatment of the surface of the filler with a palladium compound can be followed by a thorough heating step and purification step to remove solvents. The thorough heating step is preferably carried out at 0° C. to 350° C. and within a period of time of 5 minutes to 8 hours, preferably under pressures of between normal pressure and 0.01 hPa.

The treatment of the surface of the filler with a palladium compound can be carried out together with hydrophobizing of the filler. For hydrophobizing of the filler, an agent which renders it hydrophobic, preferably an organosilicon compound, can be employed. The organosilicon compound employed here is preferably one of the formula $R^1_{4-x}SiA_x$ or $(R^1_3Si)_yB$, in which $R^1$ is identical or different and is a monovalent, optionally halogen-substituted hydrocarbon radical having 1 to 18 carbon atoms per radical, A is halogen, —OH, —OR$^2$ or —OCOR$^2$, B is $NR^3_3-y$, $R^2$ is a monovalent hydrocarbon radical having 1 to 12 carbon atoms per radical, $R^3$ is a hydrogen atom or has the same meaning as $R^1$, x is 1, 2 or 3 and y is 1 or 2, or an organo(poly)siloxane comprising units of the formula $$R^1_zSiO_{(4-z)/2},$$

in which $R^1$ has the meaning given above and z is 1, 2 or 3.

Examples of radicals $R^1$ are alkyl radicals, such as the methyl, ethyl, n-propyl, iso-propyl, n-butyl, iso-butyl, tert-butyl, n-pentyl, iso-pentyl, neo-pentyl and tert-pentyl radicals; hexyl radicals, such as the n-hexyl radical; heptyl radicals, such as the n-heptyl radical; octyl radicals, such as the n-octyl radical and iso-octyl radicals, such as the 2,2,4-trimethylpentyl radical; nonyl radicals, such as the n-nonyl radical; decyl radicals cals, such as the n-decyl radical; dodecyl radicals, such as the n-dodecyl radical; octadecyl radicals, such as the n-octadecyl radical; alkenyl radicals, such as the vinyl and the allyl radical; cycloalkyl radicals, such as cyclopentyl, cyclohexyl and cycloheptyl radicals and methylcyclohexyl radicals; aryl radicals, such as the phenyl, naphthyl and anthryl and phenanthryl radical; alkaryl radicals, such as o-, m- and p-tolyl radicals, xylyl radicals and ethylphenyl radicals; and aralkyl radicals, such as the benzyl radical and the α- and the β-phenylethyl radical. Examples of halogen-substituted hydrocarbon radicals and alkyl radicals substituted by chlorine, fluorine and bromine atoms, such as the 3,3,3-trifluoro-n-propyl radical, the 2,2,2,2',2',2'-hexafluoroisopropyl radical, the heptafluoroisopropyl radical and the perfluorohexylethyl radical. A preferred example of $R^1$ is the methyl radical.

Examples of radicals $R^2$ are alkyl radicals, such as the methyl, ethyl, n-propyl, iso-propyl, n-butyl, iso-butyl, tert-butyl, n-pentyl, iso-pentyl, neo-pentyl and tert-pentyl radicals; hexyl radicals, such as the n-hexyl radical; heptyl radicals, such as the n-heptyl radical; octyl radicals, such as the n-octyl radical and iso-octyl radicals, such as the 2,2,4-trimethylpentyl radical; nonyl radicals, such as the n-nonyl radical; decyl radicals, such as the n-decyl radical; dodecyl radicals, such as the n-dodecyl radical; aryl radicals, such as the phenyl radical; alkaryl radicals, such as o-, m- and p-tolyl radicals, and aralkyl radicals, such as the benzyl radical. Preferred examples of $R^2$ are the methyl and ethyl radical.

Examples of organosilicon compounds are alkylchlorosilanes, such as methyltrichlorosilane, dimethyldichlorosilane, trimethylchlorosilane, octyltrichlorosilane, octadecyltrichlorosilane, octylmethyldichlorosilane, octadecylmethyldichlorosilane, octyldimethylchlorosilane, octadecyldimethylchlorosilane and tertbutyldimethylchlorosilane; alkylalkoxysilanes, such as dimethyldimethoxysilane, dimethyldiethoxysilane, trimethylmethoxysilane and trimethylethoxysilane; trimethylsilanol; cyclic diorgano(poly)siloxanes, such as cyclic dimethyl(poly)siloxanes, and linear diorganopolysiloxanes, such as dimethylpolysiloxanes blocked by trimethylsiloxy end groups and dimethylpolysiloxanes containing terminal hydroxyl or alkoxy groups; disilazanes, auch as hexaalkyldisilazane, in particular hexamethyldisilazane, divinyltetramethyldisilazane and bis(trifluoropropyl) tetramethyldisilazane; and cyclic dimethylsilazanes, such as cyclohexamethyltrisilazane.

Particularly useful hydrophobizing agents are low molecular weight cyclosiloxanes, such as octamethylcyclotetrasiloxane, short-chain dimethylpolysiloxanes which have terminal SiOH groups and a chain length in the range from 2 to 20, silazanes, such as hexamethyldisilazane and 1,3-divinyl-1,1,3,3-tetramethyldisilazane, and chlorosilanes, such as dimethylchlorosilane.

Mixtures of different organosilicon compounds can also be employed.

The hydrophobizing of the filler with the organosilicon compound can be carried out in a prior step, in the same step or in another step which follows the surface treatment with the palladium compound, by intensive mixing of the components and can be carried out at temperatures from 0° to 350° C. The coating is carried out under normal pressure and within a period of 30 seconds to 24 hours, preferably 5 minutes to 60 minutes. The step of coating with the palladium compound and organosilicon compound can be followed directly thereafter or after a reaction phase of 30 seconds to 24 hours, preferably 5 minutes to 60 minutes, at temperatures of 60° C. to 250° C., by a thorough heating operation at 0° C. to 400° C., preferably 50° C. to 300° C., under pressure of 0.01 hPa to normal pressure. Both the coating and the thorough heating can be carried out either continuously or discontinuously.

The silicone rubber composition according to the invention has a palladium content of preferably at least 10 ppm by weight, more preferably 30 ppm by weight, in particular 100 ppm by weight, to preferably 10000 ppm by weight, more preferably 3000 ppm by weight, in particular 1000 ppm by weight, in each case based on elemental palladium.

The silicone rubber compositions according to the invention comprise the constituents:

(I) palladium-containing heat stabilizer,
(II) polyorganosiloxane having at least two alkenyl groups per molecule,
(III) polyorganosiloxane having at least two SiH groups per molecule and
(IV) hydrosilylation catalyst.

The constituents of the silicone rubber compositions according to the invention are preferably mixed as several, in particular 2 or 3, components for storage. The components of the silicone rubber compositions according to the invention can comprise constituents I to IV and optionally other additives V in any desired combinations and ratios of amounts, with the proviso that one component does not simultaneously comprise constituents II, III and IV.

Constituent (II) of the silicone rubber compositions according to the invention is a polyorganosiloxane which contains at least two alkenyl groups per molecule and has a preferred viscosity at 25° C. in the range from 0.1 to 500,000 Pa·s, preferably 1 to 1000 Pa·s, in particular 1 to 100 Pa·s.

The polyorganosiloxane (II) is preferably built up from units of the formula $$R^4{}_aR^5{}_bSiO_{(4-a-b)/2}$$

in which
a is 0, 1 or 2 and
b is 0, 1, 2 or 3, with the proviso that at least two alkenyl groups $R^4$ are present in each molecule and the sum (a+b) is <4.

Alkenyl groups which can be chosen are all the alkenyl groups which are accessible to a hydrosilylation reaction with an SiH-functional crosslinking agent. Alkenyl groups having 2 to 6 carbon atoms, such as vinyl, allyl, methallyl, 1-propenyl, 5-hexenyl, ethinyl, butadienyl, hexadienyl, cyclopentenyl, cyclopentadienyl and cyclohexenyl, preferably vinyl and allyl, are preferably used.

$R^5$ is a substituted or unsubstituted, aliphatically saturated, monovalent hydrocarbon radical having 1 to 10 carbon atoms, preferably 1 to 6 carbon atoms. Examples of these are the alkyl groups, such as methyl, ethyl, propyl, butyl and hexyl, cycloalkyl groups, such as cyclopentyl, cyclohexyl and cycloheptyl, aryl and alkaryl groups, such as phenyl, tolyl, xylyl, mesityl, benzyl, beta-phenylethyl and naphthyl, or halogen-substituted groups, such as 3,3,3-trifluoropropyl, o-, p- and m-chlorophenyl, bromotolyl and beta-cyanoethyl.

The alkenyl groups can be bonded in any position of the polymer chain, in particular to the terminal silicon atoms.

Constituent (II) can also be a mixture of various polyorganosiloxanes containing alkenyl groups which differ, for example, in the alkenyl group content, the nature of the alkenyl group or structurally.

The structure of the polyorganosiloxanes containing alkenyl groups can be linear, cyclic or branched. In addition to monofunctional units, such as $R^4R^5{}_2SiO_{1/2}$ and $R^5{}_3SiO_{1/2}$, and difunctional units, such as $R^5{}_2SiO_{2/2}$ and $R^4R^5SiO_{2/2}$, branched polyorganosiloxanes also contain trifunctional units, such as $R^5SiO_{3/2}$ and $R^4SiO_{3/2}$, and/or tetrafunctional units of the formula $SiO_{4/2}$, in which $R^4$ and $R^5$ have the meaning given above for these radicals. The content of these tri- and/or tetrafunctional units leading to branched polyorganosiloxanes, which is typically very low, i.e., less than 0.1 mole %, should not substantially exceed 20 mole %. The polyorganosiloxane containing alkenyl groups can also contain units of the formula —OSi($R^6R^7$)$R^8$Si($R^6R^7$)O— in which both $R^6$ and $R^7$ have the meaning given above for $R^4$ and $R^5$ and $R^8$ is a bivalent organic radical, such as ethylene, propylene, phenylene, diphenylene or polyoxymethylene. Constituent (II) can have a content of such units of up to 50 mole %.

The use of the polydimethylsiloxanes containing vinyl groups, the molecules of which correspond to the formula $$(ViMe_2SiO_{1/2})_2(ViMeSiO)_a(Me_2SiO)_b$$

in which a and b are non-negative numbers and satisfy the following relationships: a+1>0, 50<(a+b)<20000, preferably 200<(a+b)-<1000, and 0<(a+1)/(a+b)<0.2, is more preferred.

Constituent (III) of the silicone rubber composition according to the invention is an SiH-functional polyorganosiloxane which is built up from units of the formula $$H_cR^5{}_dSiO_{(4-c-d)/2}$$

in which
c is 0, 1, or 2 and
d is 0, 1, 2 or 3, with the proviso that the sum (c+d) is <4 and at least two silicon-bonded hydrogen atoms are present per molecule.

The use of a polyorganosiloxane containing three or more SiH bonds per molecule is preferred. If a constituent (III) containing only two SiH bonds per molecule is used, the polyorganosiloxane (II) containing alkenyl groups preferably contains at least three alkenyl groups per molecule.

The polyorganosiloxane (III) is employed as a crosslinking agent. The hydrogen content of the crosslinking agent, which is based exclusively on the hydrogen atoms bonded directly to silicon atoms, is in the range from 0.002% to 1.7% by weight of hydrogen, preferably between 0.1% and 1.7% by weight of hydrogen.

The polyorganosiloxane (III) preferably contains at least three and preferably not more than 600 silicon atoms per molecule. The use of SiH crosslinking agents which contain between 4 and 200 silicon atoms per molecule is more preferred.

The structure of the polyorganosiloxane (III) can be linear, branched, cyclic or network-like. Linear and cyclic polyorganosiloxanes (III) are composed of units of the formula $HR^5{}_2SiO_{1/2}$, $R^5{}_3SiO_{1/2}$, $HR^5SiO_{2/2}$ and $R^5{}_2SiO_{2/2}$, in which $R^5$ has the meaning given above. Branched and network-like polyorganosiloxane (III) additionally contain trifunctional units, such as $HSiO_{3/2}$, and $R^5SiO_{3/2}$, and/or tetrafunctional units of the formula $SiO_{4/2}$. As the content of tri- and/or tetrafunctional units increases, these crosslinking agents have a network-like, resinous structure. The organic radicals $R^5$ contained in the polyorganosiloxane (III) are usually chosen such that these are compatible with the organic radicals present in constituent (II), so that constituents (II) and (III) are miscible.

Combinations and mixtures of the polyorganosiloxanes (III) described here can also be used as the crosslinking agent.

Particularly preferred polyorganosiloxanes (III) have the formula

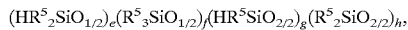

$$(HR^5{}_2SiO_{1/2})_e(R^5{}_3SiO_{1/2})_f(HR^5SiO_{2/2})_g(R^5{}_2SiO_{2/2})_h,$$

in which the non-negative integers e, f, g and h satisfy the following relationships: $(e+f)=2$, $(e+g)>2$, $5<(g+h)<200$ and $0.1<g/(g+h)\leq 1$.

The curable silicone rubber composition preferably comprises the polyorganosiloxane (III) in an amount such that the molar ratio of SiH groups to alkenyl groups is between 0.5 and 5, preferably between 1.0 and 3.0.

Constituent (IV) serves as a catalyst for the addition reaction (hydrosilylation) between the alkenyl groups of constituent (II) and the silicon-bonded hydrogen atoms of constituent (III). Numerous suitable hydrosilylation catalysts have been described in the literature. In principle, all the hydrosilylation catalysts usually employed in addition-crosslinking silicone rubber compositions can be used.

Platinum, which is fixed to finely divided support materials, such as active charcoal, aluminum oxide or silicon oxide, can be employed as the hydrosilylation catalyst.

Platinum compounds are preferably used. Those platinum compounds which are soluble in polyorganosiloxanes are more preferred. Soluble platinum compounds which can be used are, for example, the platinum-olefin complexes of the formulae $(PtCl_2.olefin)_2$ and $H(PtCl_3.olefin)$, where alkenes having 2 to 8 carbon atoms, such as ethylene, propylene and isomers of butene and octene, or cycloalkenes having 5 to 7 carbon atoms, such as cyclopentene, cyclohexene and cycloheptene, are preferably employed. Other soluble platinum catalysts are the platinum-cyclopropane complex of the formula $(PtCl_2.C_3H_6)_2$, the reaction products of hexachloroplatinic acid with alcohols, ethers and aldehydes and mixtures thereof, or the reaction product of hexachloroplatinic acid with methylvinylcyclotetrasiloxane in the presence of sodium bicarbonate in ethanolic solution. Complexes of platinum with vinylsiloxanes, such as sym-divinyltetramethyldisiloxane, are more preferred.

The hydrosilylation catalyst can also be employed in microencapsulated form, the finely divided solid which comprises the catalyst and is insoluble in the polyorganosiloxane being, for example, a thermoplastic, such as polyester resins and silicone resins. The hydrosilylation catalyst can also be employed in the form of an inclusion compound, for example in a cyclodextrin.

The amount of hydrosilylation catalyst employed depends on the desired rate of crosslinking and economic aspects. If the usual platinum catalysts are used, the platinum metal content of the curable silicone rubber composition is preferably in the range from 0.1 to 500 ppm by weight, in particular 10 to 100 ppm by weight of platinum metal.

While constituents (I) to (IV) are necessary constituents of the silicone rubber composition according to the invention, the composition can optionally comprise other additives (V) up to a content of up to 70% by weight, preferably 0.01 to 40% by weight. These additives can be, for example, fillers, dispersing auxiliaries, adhesion promoters, inhibitors, pigments, dyestuffs, plasticizers and the like.

Examples of fillers are reinforcing fillers having a specific surface area measured by the BET method of at least 50 m²/g, preferably 100–400 m²/g, such as fumed silica, silica hydrogels dehydrated while retaining their structure, for example "aerogels", and other types of precipitated silicon dioxide; and non-reinforcing fillers having a specific surface area measured by the BET method of less than 50 m²/g, such as quartz flour, diatomaceous earth, calcium silicate, zirconium silicate, zeolites, clays, metal oxides, such as iron oxide, zinc oxide, titanium dioxide and aluminum oxide, metal carbonates, such as calcium carbonate and magnesium carbonate, zinc carbonate, metal sulfates, such as calcium sulfate and barium sulfate, lithopones, mica, chalk and fibers. The fillers mentioned can be hydrophobized by treatment with the above mentioned hydrophobizing agents.

To achieve a sufficiently high mechanical strength of the silicon rubber, it is preferable to incorporate actively reinforcing fillers into the silicone rubber compositions. The use of hydrophobic fillers is particularly advantageous, since these can be mixed directly into constituent (II) in a simple manner, while the mixing-in of hydrophilic fillers necessitates addition of a hydrophobizing agent. Processes for the preparation of hydrophobic fillers and their use in silicone rubbers are known. The preferred content of actively reinforcing filler in the curable silicone rubber composition is in the range from 0% to 60% by weight, preferably 10% to 40% by weight.

Examples of plasticizers are diorganopolysiloxanes which are liquid at room temperature and blocked by triorganosiloxy end groups, such as dimethylpolysiloxanes which are blocked by trimethylsiloxy end groups and have a viscosity of 10 to 10000 mPa·s at 25° C.

Resinous polyorganosiloxanes which essentially consist of units of the formulae $R^5{}_3SiO_{1/2}$, $R^5SiO_{3/2}$ and/or $SiO_{4/2}$, and if appropriate $R^5{}_2SiO_{2/2}$ can be contained in the composition as constituent (V) up to a content of 70% by weight, preferably up to 40% by weight, based on the total weight of the silicone rubber. The molar ratio between the monofunctional and tri- or tetrafunctional units of these resinous polyorganosiloxanes is preferably in the range from 0.5 : 1 to 1.5 : 1. The compounds can also contain functional groups, in particular alkenyl groups, in the form of $R^4R^5_2SiO_{1/2}$ and/or $R^4R^5SiO_{2/2}$ units.

The silicone rubber compositions according to the invention can comprise as constituent (V), additives which are used for controlled adjustment of the processing time and rate of crosslinking of the curable silicone rubber composition. These inhibitors and stabilizers which are for example, acetylenic alcohols, such as ethynylcyclohexanol and 2-methyl-3-butyn-2-ol, polymethylvinylcyclosiloxanes, such as methylvinylcyclotetrasiloxane, low molecular weight siloxane oils having vinyldimethylsiloxy end groups, trialkyl cyanurates, alkyl maleates, such as diallyl maleate and dimethyl maleate, alkyl fumarates, such as diethyl fumarate and diallyl fumarate, organic hydroperoxides, such as cumene hydroperoxide, tert-butyl hydroperoxide and pinane hydroperoxide, organic peroxides, benzotriazole, organic sulfoxides, organic amines and amides, phosphines, phosphites, nitriles, diaziridines and oximes.

The silicone rubber compositions according to the invention can also comprise as constituent (V) heat stabilizers such as carbon black, graphite, metal dusts and compounds of Ti, Mn, Fe, Co, Ni, Cu, Zr, Hf and Ce. Since the various heat stabilizers sometimes have different action mechanisms, a higher heat-stabilizing effect, for example in respect of individual mechanical properties, can often be achieved by combination thereof than if a single heat stabilizer is used.

The invention also relates to the use of palladium and compounds thereof as a heat stabilizer in addition-crosslinking silicone rubber compositions.

The silicone rubber compositions according to the invention are prepared by mixing together constituents (I) to (IV) and optionally (V). Preferably, the constituents are mixed as several, preferably 3, or in particular 2, components, only one of the components comprising the constituent (III) containing SiH groups and another comprising the hydrosilylation catalyst (IV), so that full curing or crosslinking of the silicone rubber composition to a silicone rubber can take place only after these two components have been mixed. The content of the other constituents in the components can be chosen as desired. Any desired sequence of mixing of the constituents can be chosen, but if a filler is used as constituent (V) the procedure described in the following has proved to be advantageous. In a first step, the filler is mixed with the polyorganosiloxane (II) containing alkenyl groups to give a uniform mixture, the base composition. The filler is incorporated into the polyorganosiloxane (II) in a suitable mixer, for example a kneader. A distinction can be made between two types of incorporation of the filler, i.e., preparation of the base composition, depending on the hydrophobicity of the filler (hydrophobic or hydrophilic).

Process A:

Hydrophobic fillers can be mixed directly, i.e., without further additives, with the polyorganosiloxane (II) containing alkenyl groups. Elevated temperatures and the highest possible filler content during mixing have an advantageous effect on the rate of dispersion and quality of dispersion of the filler in the organopolysiloxane (II). For this reason, the filler is preferably mixed into the polyorganosiloxane at a temperature in the range from 100° C. to 200° C., in particular 140° C. to 160° C. A mixture of the highest possible viscosity is advantageously first prepared by successive mixing of the filler into a suitable portion of the polyorganosiloxane (II), this mixture allowing optimum destructuring and dispersion of the filler by the use of sufficiently high shearing forces. The highly viscous mixture is usually subjected to shear for 0.5 to 5 hours at the above temperatures, if appropriate in vacuo. The duration of the mixing process depends on the amount, the viscosity and the shear parameters. The desired filler content is then established by addition of the remaining amount of polyorganosiloxane and intensive mixing. The filler content is in the range from 0% to 60% by weight, preferably in the range from 10% to 40% by weight. If appropriate, constituents (I), (IV) and (V) can also be incorporated during preparation of the base composition.

Process B:

Base compositions for addition-crosslinking silicone rubber compositions are prepared using hydrophilic fillers by mixing the filler with constituent (II) and optionally other constituents in the presence of a suitable hydrophobizing agent. Suitable hydrophobizing agents are described above. The organic radicals contained in the hydrophobizing agent are advantageously chosen such that these are largely compatible with the organic radicals present in constituent (II), which facilitates optimum dispersion of the filler in the polyorganosiloxane and promotes good flow properties of the base composition. The hydrophobizing process can be accelerated by addition of small amounts of water.

100 parts by weight of polyorganosiloxane (II) can be mixed with 1 to 150 parts by weight of filler, preferably with 30 to 80 parts by weight of filler. The amount of hydrophobizing agent to be employed depends inter alia, on the nature of the hydrophobizing agent, the filler content of the mixture, the silanol group content of the filler and the desired degree of hydrophobization. If hexamethyldisilazane is used, the amount employed is in the range from 1% to 20% by weight, preferably 5% to 10% by weight, based on the filler/polyorganosiloxane mixture. Water can be added in an amount of 5% to 100% by weight, based on the amount of hydrophobizing agent, for the purpose of accelerating the progress of the reaction. By-products formed, such as ammonia, alcohols and hexamethyldisiloxane, and other volatile constituents, such as water and low molecular weight organosiloxanes, are removed after the in situ hydrophobizing of the filler by heat treatment of the mixture at a temperature in the range from 120° C. to 200° C. for 2 to 8 hours, preferably in the range from 130° C. to 160° C. for 3 to 5 hours, advantageously in vacuo and with continuous kneading.

In a second step, at least two components are prepared by admixing to the base composition prepared according to process A or B, comprising all or some of the constituents (I) to (IV) and optionally (V), with the proviso that no component simultaneously comprises constituents (II), (III) and (IV). Separation into a component comprising the SiH-functional crosslinking agent (III) and a component comprising the hydrosilylation catalyst (IV) is expedient and preferred, so that full curing of the composition to a silicone rubber can occur only after mixing thereof.

The silicone rubber compositions according to the invention are particularly suitable for the production of silicone rubber objects which have a high heat resistance, such as seals, sealing materials, electrical insulating materials, conveyor belts exposed to heat, roller coverings, hoses and films.

In the examples described below, all the viscosity data are based on a temperature of 25° C. Unless stated otherwise, the following examples are carried out under a pressure of the surrounding atmosphere of about 1000 hPa, and at room temperature at about 20° C., or at a temperature which is established when the reactants are brought together at room temperature without additional heating or cooling. All the parts and percentages data furthermore relate to the weight, unless stated otherwise.

1. PREPARATION OF Pd-CONTAINING HEAT STABILIZERS AND COMPARISON EXAMPLES WHICH ARE NOT ACCORDING TO THE INVENTION

EXAMPLE 1

10 g of a 1.67% strength aqueous hydrochloric acid with a content of 8.4 g/kg of palladium(II) chloride and 45 g of hexamethyldisilazane (obtainable from Wacker-Chemie GmbH under the name Silazan HMN) were admixed at 25° C. to 100 g of a fumed silica having a specific surface area measured by the BET method of 300 $m^2/g$ (obtainable from Wacker-Chemie GmbH under the name Wacker HDK$^R$ T30). After homogenization at 25° C. for 30 minutes and thorough heating under normal pressure under a stream of nitrogen at 150° C. for 1 hour and thorough heating under normal pressure under a stream of nitrogen at 250° C. for 1 hour, a yellowish-white powder which had a carbon content of 3.7% by weight and a palladium content of 430 ppm by weight was obtained.

The silicone rubber sample was prepared using this silica in the manner described below under 2.1, 3 and 4.

EXAMPLE 2

10 g of a 1.67% strength aqueous hydrochloric acid having a content of 8.4 g/kg of palladium(II) chloride were admixed at 25° C. to 100 g of a fumed silica having a specific surface area measured by the BET method of 300 $m^2/g$ (obtainable from Wacker-Chemie GmbH under the name Wacker HDK$^R$ T30). After homogenization at 25° C. for 30 minutes and thorough heating under normal pressure under a stream of nitrogen at 250° C. for 1 hour, a yellowish-brown powder which had a carbon content of 0.01% by weight and a palladium content of 460 ppm by weight was obtained.

The silicone rubber sample was prepared using this silica in the manner described under 2.2, 3 and 4.

COMPARISON EXAMPLE 3

(not according to the invention)

10 g of a 0.1N aqueous hydrochloric acid having a content of 13 g/kg of copper(II) chloride dihydrate and 45 g of hexamethyldisilazane (obtainable from Wacker-Chemie GmbH under the name Silazan HMN) were admixed at 25° C. to 100 g of a fumed silica having a specific surface area measured by the BET method of 300 $m^2/g$ (obtainable from Wacker-Chemie GmbH under the name Wacker HDK$^R$ T30). After homogenization at 25° C. for 30 minutes and thorough heating under normal pressure under a stream of nitrogen at 150° C. for 1 hour and thorough heating under normal pressure under a stream of nitrogen at 300° C. for 2 hours, a white powder which had a carbon content of 3.8% by weight and a copper content of 430 ppm by weight was obtained.

The silicone rubber sample was prepared using this silica in the manner described under 2.1, 3 and 4.

COMPARISON EXAMPLE 4

(not according to the invention)

10 g of an aqueous solution of 13.3 g/kg of cerium(III) chloride heptahydrate and 45 g of hexamethyldisilazane (obtainable from Wacker-Chemie GmbH under the name Silazan HMN) were admixed at 25° C. to 100 g of a fumed silica having a specific surface area measured by the BET method of 300 $m^2/g$ (obtainable from Wacker-Chemie GmbH under the name Wacker HDK$^R$ T30). After homogenization at 25° C. for 30 minutes and thorough heating under normal pressure under a stream of nitrogen at 150° C. for 1 hour and thorough heating under normal pressure under a stream of nitrogen at 200° C. for 1 hour, a white powder which had a carbon content of 3.7% by weight and a cerium content of 440 ppm by weight was obtained.

The silicone rubber sample was prepared using this silica in the manner described under 2.2, 3 and 4.

COMPARISON EXAMPLE 5

(not according to the invention)

10 g of a 0.1 N aqueous hydrochloric acid having a content of 24.2 g/kg of iron(III) chloride hexahydrate and 16.2 g of hexamethyldisilazane (obtainable from Wacker-Chemie GmbH under the name Silazan HMN) were admixed at 25°C. to 100 g of a fumed silica having a specific surface area measured by the BET method of 300 $m^2/g$ (obtainable from Wacker-Chemie GmbH under the name Wacker HDK$^R$ T30). After homogenization at 25° C. for 30 minutes and thorough heating under normal pressure under a stream of nitrogen at 150° C. for 1 hour and thorough heating under normal pressure under a stream of nitrogen at 300° C. for 2 hours, a white powder which had a carbon content of 3.5% by weight and an iron content of 460 ppm by weight was obtained.

The silicone rubber sample was prepared using this silica in the manner described under 2.2, 3 and 4.

EXAMPLE 6

Dibenzonitrile-palladium(II) chloride, having the palladium content of 27.7% by weight, was prepared in accordance with the instructions given in "J. Am. Chem. Soc. (1938), 60, 882". 3.61 g of dibenzonitrile-palladium(II) chloride were dissolved in 50 ml of acetone and the solution was mixed intimately for 2 hours with 96.39 g of a polydimethylsiloxane having terminal dimethylvinylsiloxy groups and a viscosity of 1020 mPa·s at 25° C. The acetone was then removed at a temperature of 50° C. in vacuo on a rotary evaporator. A stable dispersion colored brown-black was obtained.

The silicone rubber samples were prepared using this palladium-containing heat stabilizer by mixing 0, 1, 3 or 5 g of heat stabilizer with 200, 199, 197 or 195 g of a liquid silicone rubber composition comprising equal parts of A and B components, which is obtainable under the name Elastosil® LR 3003/50 from Wacker-Chemie GmbH. This mixture was crosslinked to the silicone rubber in a hydraulic press at a temperature of 170° C. for 15 minutes, as described under 4. The silicone rubber foils removed from the mold were heat-treated in a circulating air drying cabinet at 200° C. for 4 hours. Silicone rubbers in which the palladium content was 0, 50, 150 or 250 ppm by weight respectively, based on elemental palladium, were obtained.

COMPARISON EXAMPLE 7

(not according to the invention)

20 parts by weight of a lamp black (obtainable from Degussa AG under the name Durex® O Powder) were mixed with 80 parts by weight of a polydimethylsiloxane having dimethylvinylsiloxy terminal groups and a viscosity of 1000 mPa·s at 25° C. to give a homogeneous composition.

The silicone rubber samples were prepared using this heat stabilizer containing carbon black by mixing 5 g of the heat stabilizer with 195 g of a liquid silicone rubber composition comprising equal parts of A and B components, which is obtainable under the name Elastosil® LR 3003/50 from Wacker-Chemie GmbH. The mixture was further processed to the silicone rubber as described under 4.

EXAMPLE 8

0.5 g of finely divided palladium(II) phthalocyanine were dispersed, by intensive mixing on a mill, in 199.5 g of a liquid silicone rubber composition comprising equal parts of A and B components, which is obtainable under the name Elastosil® LR 3003/50 from Wacker-Chemie GmbH. This mixture was further processed to a silicone rubber which comprised 430 ppm by weight of palladium as described under 4.

A corresponding silicone rubber which, however, did not comprise the palladium(II) phthalocyanine was prepared for the purpose of comparison.

2. PREPARATION OF THE BASE COMPOSITION

FOR THE ADDITION-CROSS LINKING SILICONE RUBBER

The base composition was prepared using the metal-containing silica described in the examples according to their degree of hydrophobization.

2.1 Preparation of the Base Composition Using Hydrophobic Silica 240 parts by weight of a polydimethylsiloxane having vinyldimethylsiloxy terminal groups and a viscosity of 20 Pa·s at 25° C. were mixed with 180 parts by weight of the hydrophobic filler, which was added in portions, in a double-Z kneader at a temperature of 50° C. for 1 hour to give a homogeneous composition. This highly viscous composition was then kneaded at 150° C. in vacuo (<100 mbar) for 3 hours. After this thorough heating phase, a further 150 parts by weight of the vinyl-functional polydimethylsiloxane were mixed in and the composition was homogenized at room temperature for 1 hour. A homogeneous base composition comprising about 30% by weight of filler was obtained.

2.2 Preparation of the Base Composition Using Hydrophilic Silica 230 parts by weight of a polydimethylsiloxane having vinyldimethylsiloxy terminal groups and a viscosity of 20 Pa·s at 25° C. were mixed with 40 parts by weight of hexamethyldisilazane (obtainable from Wacker-Chemie GmbH under the name Silazan HMN), 15 parts by weight of water and 140 parts by weight of fumed silica, which was added in portions and mixed in, at room temperature in a double-Z kneader for 1.5 hours to give a homogeneous composition.

The mixture was then kneaded at 150° C. in vacuo (<100 mbar) for 3 hours for the purpose of removing volatile constituents and by-products. After this thorough heating phase, a further 100 parts by weight of the vinyl-functional polydimethylsiloxane were mixed into the composition in portions and the composition was homogenized at room temperature for 1 hour. A homogeneous base composition comprising about 30% by weight of filler was obtained.

3. PREPARATION OF THE A AND B COMPONENTS OF

THE CURABLE SILICONE RUBBER COMPOSITION

To prepare the A component of the curable silicone rubber composition, 100 parts by weight of base composition were mixed with 0.2 part by weight of a solution, containing 1% by weight of platinum (based on elemental platinum), of a platinum catalyst (solution of a platinum-sym-divinyltetramethyldisiloxane complex in a polydimethylsiloxane having dimethylvinylsiloxy end groups and a viscosity of 1000 mPa·s at 25° C.; obtainable from Wacker-Chemie GmbH under the name Katalysator OL) and 0.1 part by weight of the inhibitor ethynylcyclohexanol to give a homogeneous composition.

To prepare the B component of the curable silicone rubber composition, 100 parts by weight of the base composition prepared by process (A) or (B) were mixed with 3.5 parts by weight of a copolymer of dimethylsiloxy, methylhydridosiloxy and trimethylsiloxy units having a viscosity of 320 mPa·s at 25° C. and 0.48% by weight of Si-bonded hydrogen.

4. PREPARATION OF THE CROSSLINKED SILICONE RUBBERS

The crosslinked silicone rubbers were prepared by intimately mixing the A and B component in a ratio of 1:1 on a mill at a temperature of the rolls of 25° C. for 15 minutes.

This mixture was then crosslinked in a hydraulic press at a temperature of 170° C. for 15 minutes to give the silicone rubber. The silicone rubber foils about 2 mm and 6 mm thick removed from the mold were subjected to heat treatment at 200° C. in a circulating air drying cabinet for 4 hours.

5. MECHANICAL VALUES OF THE SILICONE RUBBERS BEFORE AND AFTER EXPOSURE TO HEAT

The heat stability of the silicone rubber samples prepared using the heat stabilizers according to the invention and not according to the invention described in examples 1 to 7 was evaluated with the aid of the following criteria:

(a) Mechanical elastomer properties, such as Shore A hardness (in accordance with DIN 53 505), tensile strength (in accordance with DIN 53 504-S1), elongation at break (in accordance with DIN 53 504-S1) and tear strength (in accordance with ASTM D624) before and after exposure of the silicone rubber samples to heat by open storage at a temperature of 250° C. in a circulating air drying cabinet for 50 hours. Table 1 (example 1, 2, 3, 4 and 5) illustrates the different heat-stabilizing effect of various metals for the same form of application and a comparable metal content. The higher heat stability of the palladium-containing silicone rubber can be seen in particular.

(b) Shore A hardness (in accordance with DIN 53 505) of the silicone rubber samples was performed before and after exposure to heat by open storage at a temperature of 250° C. in a circulating air drying cabinet for 10, 20, 30, 40, 50 and 100 days to determine if premature embrittlement does not occur (table 2; example 1, 3 and 4). It can be seen that the tendency of the palladium-containing silicone rubber toward embrittlement was significantly lower than in the case of silicone rubbers containing copper or cerium in a comparable amount.

(c) Value of the complex dynamic modulus under compressive deformation (in accordance with DIN 53 513; preliminary elongation: −2%; dynamic elongation: 0.5%; measurement frequency 10 Hz). The modulus measurements were carried out on cylindrical silicone rubber test specimens (height: 6 mm; diameter: 10 mm) before and after exposure to heat by open storage at a temperature of 250° C. in a circulating air drying cabinet for 5, 10, 20, 30, 40 and 50 days. Five test specimens were measured per material, and the dynamic modulus was determined by obtaining the arithmetic mean from the individual measurements (table 3; example 1, 3 and 4). The considerably smaller increase in modulus demonstrates that the elasticity of the palladium-containing silicone rubber was largely retained over a relatively long storage period at 250° C.

(d) Percentage weight loss of the cylindrical silicone rubber test specimen described under (c) after exposure to heat by open storage at a temperature of 250° C. in a circulating air drying cabinet for 5, 10, 20, 30, 40 and 50 days, the percentage weight loss again being determined by obtaining the arithmetic mean of 5 individual measurements carried out per material (table 4; example 1, 3 and 4). The weight loss of palladium-containing silicone rubbers was lower.

(e) Mechanical elastomer properties, such as Shore A, tensile strength, elongation at break and tear strength (in accordance with the above test specifications) before and after exposure to heat by open storage at 250° C. in a circulating air drying cabinet for 3 and 7 days as a function of the palladium content of the silicone rubber (table 5; example 6 and 7). The increase in the heat stability of the silicone rubber as the content of palladium increases is illustrated. To achieve a comparable heat stability with, for example, carbon black, considerably larger amounts of carbon black had to be employed.

(f) Mechanical elastomer properties, such as Shore A, tensile strength, elongation at break and tear strength (in accordance with the above test specifications) before and after exposure to heat by open storage at 250° C. in a circulating air drying cabinet for 2 and 3 days (table 6; example 8). The palladium-containing silicone rubber was distinguished by the elasticity (elongation at break) and the mechanical strength (tensile strength and tear strength) being largely retained compared with the corresponding non-stabilized silicone rubber sample.

TABLE 1

Mechanical elastomer properties before and after exposure to heat

| | Exposure to heat | Metal content of silicone rubber | Shore A | Tensile strength (N/mm$^2$) | Elongation at break (%) | Tear strength (N/mm) |
|---|---|---|---|---|---|---|
| No addition | — | 0 ppm | 40 | 8.3 | 610 | 31.9 |
| No addition | 50 h/250° C. | 0 ppm | 52 | 3.2 | 90 | 9.3 |
| Example 1 | — | 135 ppm Pd | 42 | 8.2 | 590 | 31.3 |
| Example 1 | 50 h/250° C. | 135 ppm Pd | 41 | 7.9 | 380 | 28.6 |
| Example 2 | — | 135 ppm Pd | 41 | 8.0 | 550 | 27.5 |
| Example 2 | 50 h/250° C. | 135 ppm Pd | 42 | 7.2 | 330 | 23.9 |
| Example 3 | — | 135 ppm Cu | 43 | 7.3 | 540 | 27.8 |
| Example 3 | 50 h/250° C. | 135 ppm Cu | 42 | 5.4 | 250 | 22.1 |

TABLE 1-continued

Mechanical elastomer properties before and after exposure to heat

| | Exposure to heat | Metal content of silicone rubber | Shore A | Tensile strength (N/mm$^2$) | Elongation at break (%) | Tear strength (N/mm) |
|---|---|---|---|---|---|---|
| Example 4 | — | 135 ppm Ce | 40 | 7.3 | 560 | 33.1 |
| Example 4 | 50 h/250° C. | 135 ppm Ce | 40 | 7.4 | 350 | 16.9 |
| Example 5 | — | 140 ppm Fe | 43 | 8.4 | 560 | 37.8 |
| Example 5 | 50 h/250° C. | 140 ppm Fe | 47 | 6.3 | 180 | 10.7 |

TABLE 2

Course of the Shore A during storage at 250° C.

| | 0 d/ 250° C. | 10 d/ 250° C. | 20 d/ 250° C. | 30 d/ 250° C. | 40 d/ 250° C. | 50 d/ 250° C. | 100 d/ 250° C. |
|---|---|---|---|---|---|---|---|
| No addition | 41 | 65 | 87 | brittle | | | |
| Example 1 | 42 | 44 | 47 | 48 | 49 | 51 | 61 |
| Example 3 | 43 | 52 | 58 | 63 | 65 | 68 | 78 |
| Example 4 | 39 | 57 | 63 | 71 | 73 | 75 | 84 |

TABLE 3

Course of the modulus (in MPa) during storage at 250° C.

| | 0 d/ 250° C. | 5 d/ 250° C. | 10 d/ 250° C. | 20 d/ 250° C. | 30 d/ 250° C. |
|---|---|---|---|---|---|
| No addition | 3.05 | 8.36 | 21.04 | 104.01 | brittle |
| Example 1 | 2.90 | 2.79 | 2.76 | 2.91 | 3.09 |
| Example 3 | 3.B1 | 3.56 | 3.94 | 5.07 | 6.48 |
| Example 4 | 2.89 | 4.81 | 6.31 | 8.29 | 10.75 |

TABLE 4

Percentage weight loss during storage at 250° C.

| | 5 d/ 250° C. | 10 d/ 250° C. | 20 d/ 250° C. | 30 d/ 250° C. | 40 d/ 250° C. |
|---|---|---|---|---|---|
| No addition | 3.8 | 7.5 | 10.6 | 13.2 | brittle |
| Example 1 | 1.8 | 2.3 | 2.7 | 3.0 | 3.5 |
| Example 3 | 2.4 | 3.2 | 4.2 | 5.3 | 6.5 |
| Example 4 | 2.9 | 3.8 | 5.9 | 7.1 | 8.2 |

TABLE 5

Mechanical elastomer properties before and after exposure to heat

| | Exposure to heat | Metal content of silicone rubber | Shore A | Tensile strength (N/mm$^2$) | Elongation at break (%) | Tear strength (N/mm) |
|---|---|---|---|---|---|---|
| No addition | — | — | 50 | 9.6 | 510 | 38.4 |
| No addition | 3 d/250° C. | — | 58 | 3.7 | 130 | 4.5 |
| Example 6 | — | 50 ppm Pd | 49 | 9.1 | 480 | 38.2 |
| Example 6 | 3 d/250° C. | 50 ppm Pd | 45 | 6.0 | 270 | 20.9 |
| Example 6 | 7 d/250° C. | 50 ppm Pd | 49 | 5.6 | 200 | 9.5 |
| Example 6 | — | 150 ppm Pd | 49 | 8.9 | 510 | 39.7 |
| Example 6 | 3 d/250° C. | 150 ppm Pd | 43 | 6.9 | 330 | 26.9 |
| Example 6 | 7 d/250° C. | 150 ppm Pd | 45 | 5.6 | 250 | 18.7 |
| Example 6 | — | 250 ppm Pd | 48 | 9.0 | 530 | 35.4 |
| Example 6 | 3 d/250° C. | 250 ppm Pd | 43 | 7.5 | 380 | 27.1 |
| Example 6 | 7 d/250° C. | 250 ppm Pd | 44 | 6.4 | 310 | 22.3 |
| Example 7 | — | (0.5% by weight carbon black) | 48 | 8.8 | 520 | 38.2 |
| Example 7 | 3 d/250° C. | (0.5% by weight carbon black) | 47 | 7.1 | 290 | 22.5 |
| Example 7 | 7 d/250° C. | (0.5% by weight carbon black) | 50 | 6.2 | 230 | 14.5 |

TABLE 6

Mechanical elastomer properties before and after exposure to heat

| Exposure to heat | Pd content of silicone rubber | Shore A | Tensile strength (N/mm$^2$) | Elongation at break (%) | Tear strength (N/mm) |
|---|---|---|---|---|---|
| No addition | — | — | 50 | 9.6 | 510 | 38.4 |
| No addition | 2 d/250° C. | — | 55 | 5.8 | 142 | 4.9 |
| No addition | 3 d/250° C. | — | 58 | 3.7 | 130 | 4.5 |
| Example 8 | — | 430 ppm | 51 | 8.1 | 420 | 33.9 |
| Example 8 | 2 d/250° C | 430 ppm | 52 | 6.5 | 330 | 28.8 |
| Example 8 | 3 d/250° C. | 430 ppm | 52 | 6.3 | 310 | 25.6 |

What is claimed is:

1. An addition-crosslinking silicone composition crosslinkable to a silicone rubber displaying increased heat resistance, comprising:
   a) an effective, heat-stabilizing amount of a palladium heat-stabilizing compound;
   b) a polyorganosiloxane having at least two alkenyl groups per molecule;
   c) a polyorganosiloxane having at least two SiH groups per molecule;
   d) a hydrosilylation catalyst; wherein said palladium compound a) exhibits substantially no hydrosilylation catalytic activity, and wherein the heat resistance of said silicone rubber is greater than an otherwise similar rubber not containing said palladium compound a).

2. The composition of claim 1 wherein said palladium heat-stabilizing compound is selected from the group consisting of:

$PdX_2$, $L_2PdX_2$, $L_2Pd_2X_2$, $L_4PdX_2$, $L_2PdX_4$, $PdL_4$, $M_2PdX_4$ or $M_2PdX_6$, in which
   X is an inorganic ligand selected from the group consisting of the halides, $NO_2$, $NO_3$, 0.5 $SO_4$, and CN; a carboxylic acid radical of the formula OCOR' in which R' is an unsubstituted or substituted alkyl, cycloalkyl, or aryl radical having 1–20 carbon atoms; a complexing unsubstituted or substituted organic anion; and OH;
   L is a donor selected from the group consisting of amines of the formula $NR_3"$ wherein each R" individually is hydrogen, alkyl, cycloalkyl, or aryl; diamines; bipyridyl; phosphorus containing ligands of the formulae $PR_3"$ and $Ph_2P—(CH_2)_n—PPh_2$ where n is 1 or 2; nitriles; and dienes; and
   M is hydrogen, $NH_4$, an alkali metal, or an alkaline earth metal;
   and mixtures thereof.

3. The composition of claim 1 wherein said palladium heat-stabilizing compound comprises a finely divided support material addition product of a palladium compound selected from the group consisting of:

$PdX_2$, $L_2PdX_2$, $L_2Pd_2X_2$, $L_4PdX_2$, $L_2PdX_4$, $PdL_4$, $M_2PdX_4$ or $M_2PdX_6$, in which
   X is an inorganic ligand selected from the group consisting of the halides, $NO_2$, $NO_3$, 0.5 $SO_4$, and CN; a carboxylic acid radical of the formula OCOR' in which R' is an unsubstituted or substituted alkyl, cycloalkyl, or aryl radical having 1–20 carbon atoms; a complexing unsubstituted or substituted organic anion; and OH;
   L is a donor selected from the group consisting of amines of the formula $NR_3"$ wherein each R" individually is hydrogen, alkyl, cycloalkyl, or aryl; diamines; bipyridyl; phosphorus containing ligands of the formulae $PR_3"$ and $Ph_2P—(CH_2)_n—PPh_2$ where n is 1 or 2; nitrites; and dienes; and
   M is hydrogen, $NH_4$, an alkali metal, or an alkaline earth metal;
   and mixtures thereof.

4. The composition of claim 3 wherein said finely divided support material addition product is prepared by reacting an aqueous solution of said palladium compound with pyrogenic silica or activated charcoal.

5. The composition of claim 3 wherein said finely divided support material addition product is prepared by reacting an aqueous solution of said palladium compound with pyrogenic silica in the presence of a hydrophobicizing agent.

6. The composition of claim 5 wherein said hydrophobicizing agent comprises hexamethyldisilazane.

7. The composition of claim 1 wherein said palladium heat-stabilizing compound comprises the reaction product of a solution of palladium (II) chloride with pyrogenic silica.

8. The composition of claim 1 wherein said palladium compound comprises the reaction product of a solution of palladium (II) chloride with pyrogenic silica in the presence of a hydrophobicizing agent.

9. The composition of claim 1 wherein said palladium heat-stabilizing compound is present in said composition in an amount of from 10 ppm to 3000 ppm based on the weight of elemental palladium relative to the total weight of said composition.

10. The composition of claim 1 wherein said palladium heat-stabilizing compound is the reaction product of a palladium compound with a functionalized siloxane reactive therewith.

11. The composition of claim 10 wherein said functionalized siloxane is selected from the group consisting of $C_{1-6}$ alkenyl substituted siloxanes, siloxanes bearing primary, secondary, or tertiary aminoalkyl groups, and siloxanes bearing pyridyl groups.

12. A method of increasing the heat resistance of a silicon rubber prepared by the addition of crosslinking of polysiloxanes containing two or more alkenyl groups (1) with polysiloxanes containing two or more SiH groups, (2) in the presence of a hydrosilylation catalyst, (3) said method comprising:
   adding to one or more of (1), (2) or (3) an effective, heat-stabilizing amount of a heat-stabilizer comprising palladium or a palladium compound, wherein said palladium or said palladium compound exhibits substantially no hydrosilation catalytic activity.

13. The method of claim 12 wherein the amount of said palladium or palladium compound is from 10 ppm to 3000 ppm based on the weight of said silicone rubber.

14. The method of claim 13 wherein said heat-stabilizer is a palladium compound selected from the group consisting of:

$PdX_2$, $L_2PdX_2$, $L_2Pd_2X_2$, $L_4PdX_2$, $L_2PdX_4$, $PdL_4$, $M_2PdX_4$ or $M_2PdX_6$, in which X is an inorganic ligand selected from the group consisting of the halides, $NO_2$, $NO_3$, $0.5\ SO_4$, and CN; a carboxylic acid radical of the formula OCOR' in which R' is an unsubstituted or substituted alkyl, cycloalkyl, or aryl radical having 1–20 carbon atoms; a complexing unsubstituted or substituted organic anion; and OH;

L is a donor selected from the group consisting of amines of the formula $NR_3''$ wherein each R" individually is hydrogen, alkyl, cycloalkyl, or aryl; diamines; bipyridyl; phosphorus containing ligands of the formulae $PR_3''$ and $Ph_2P\text{---}(CH_2)_n\text{---}PPh_2$ where n is 1 or 2; nitriles; and dienes; and M is hydrogen, $NH_4$, an alkali metal, or an alkaline earth metal;

and mixtures thereof.

15. The method of claim 14 wherein said palladium compound is reacted with finely divided support material.

16. The method of claim 15 wherein said finely divided support material is selected from the group consisting of pyrogenic silica, activated charcoal, and mixtures thereof.

17. The method of claim 15 wherein said palladium compound is reacted with pyrogenic silica in the presence of a hydrophobicizing agent.

* * * * *

UNITED STATES PATENT AND TRADEMARK OFFICE
CERTIFICATE OF CORRECTION

PATENT NO.    : 6,294,635 B1
DATED         : September 25, 2001
INVENTOR(S)   : Frank Achenbach et al.

It is certified that error appears in the above-identified patent and that said Letters Patent is hereby corrected as shown below:

<u>Column 22,</u>
Line 9, delete "nitrites" and insert therefor -- nitriles --.

Signed and Sealed this

Fourteenth Day of January, 2003

JAMES E. ROGAN
*Director of the United States Patent and Trademark Office*